(12) United States Patent
Ott et al.

(10) Patent No.: US 8,950,816 B2
(45) Date of Patent: Feb. 10, 2015

(54) ARM REST ARRANGEMENT FOR A SEAT, IN PARTICULAR FOR A VEHICLE SEAT

(71) Applicant: Grammer AG, Amberg (DE)

(72) Inventors: Richard Ott, Kuemmersbruck (DE); Hermann Meiller, Wernberg-Koeblitz (DE)

(73) Assignee: Grammer AG (DE)

( * ) Notice: Subject to any disclaimer, the term of this patent is extended or adjusted under 35 U.S.C. 154(b) by 0 days.

(21) Appl. No.: 14/109,372

(22) Filed: Dec. 17, 2013

(65) Prior Publication Data

US 2014/0167477 A1    Jun. 19, 2014

(30) Foreign Application Priority Data

Dec. 18, 2012 (DE) .......................... 10 2012 112 558

(51) Int. Cl.
*B60N 2/46* (2006.01)
(52) U.S. Cl.
CPC ............ *B60N 2/4606* (2013.01); *B60N 2/4633* (2013.01)
USPC .................................................... 297/411.32
(58) Field of Classification Search
USPC ............... 297/411.33, 411.34, 411.3, 411.32, 297/411.38
See application file for complete search history.

(56) References Cited

U.S. PATENT DOCUMENTS

| | | | |
|---|---|---|---|
| 4,828,323 A * | 5/1989 | Brodersen et al. ....... | 297/411.36 |
| 5,743,595 A | 4/1998 | Kirdulis | |
| 8,132,861 B2 * | 3/2012 | Cone ........................ | 297/411.32 |
| 2002/0096928 A1 | 7/2002 | Bidare | |
| 2010/0194168 A1* | 8/2010 | Titz .......................... | 297/411.38 |

FOREIGN PATENT DOCUMENTS

| | | |
|---|---|---|
| DE | 6939112 | 3/1974 |
| DE | 4042105 | 10/1992 |
| GB | 2170099 A * | 7/1986 |
| JP | H01-131357 | 9/1989 |

OTHER PUBLICATIONS

European Search Report (no English translation available) for European Patent Application No. 13196759.8 dated Apr. 14, 2014, 6 pages.

* cited by examiner

*Primary Examiner* — Milton Nelson, Jr.
(74) *Attorney, Agent, or Firm* — Sheridan Ross P.C.

(57) ABSTRACT

The invention relates to an arm rest arrangement for a seat, in particular for a vehicle seat, with an arm rest which is pivotably connected by means of a bearing axis to an arm rest support, wherein a latching and adjusting device is provided for setting an angle of inclination between the arm rest and the arm rest support in a usage position and for folding down the arm rest from the usage position into a non-usage position, wherein the latching and adjusting device is mounted so as to be rotatable in a rotary element within a housing of the armrest and the latching and adjusting device is mounted so as to be rotatable about its longitudinal axis (L) in the housing for setting of the angle of inclination.

19 Claims, 12 Drawing Sheets

ARM REST ARRANGEMENT FOR A SEAT, IN PARTICULAR FOR A VEHICLE SEAT

CROSS-REFERENCE TO RELATED APPLICATIONS

This application claims the benefit of German Application No. 10 2012 112 558.9 filed Dec. 18, 2012, the disclosure of which is incorporated herein by reference.

DESCRIPTION

The invention relates to an arm rest arrangement for a seat, in particular for a vehicle seat, and to a vehicle seat with such an arm rest arrangement.

The arm rest arrangement for a seat, in particular for a vehicle seat, comprises an arm rest which is pivotably connected by means of a bearing axis to an arm rest support, according to the preamble to claim 1.

Generic arm rest arrangements are already well known from the prior art.

For example the German Utility Model DE 6939112 shows an arm rest on the seat back of a motor vehicle, wherein the arm rest on the adjustable seat back of the motor vehicle is disposed so as to be pivotable upwards in a non-usage position. For this purpose the arm rest comprises, for a gradual adjustment of the inclination of the arm rest with respect to the seat back, a supporting cam which is disposed non-rotatably on the seat back and a supporting rod which is mounted on the arm rest and is movable towards and away from the supporting cam. The arm rest can be adjusted at different angles of inclination relative to the seat back by a movement of the supporting rod towards the supporting cam firmly mounted on the seat back.

However, this known arm rest exhibits the defect that for a driver who wishes to occupy the driver's seat and to sit in it, the arm rest is always a hindrance in his way. In other words, the arm rest according to this document cannot be folded down in order to give the driver a greater free space for occupying the motor vehicle seat.

Furthermore, the document DE 4042105 C1 discloses an arm rest arrangement for parallel vertical adjustment of the arm rest by changing the angular position of the arm rest support and also for folding up the arm rest in relation to the arm rest support. However, the mechanism for parallel vertical adjustment and the folding up of the arm rest is implemented by means of a costly and complicated gear mechanism integrated in the arm rest support. Also in this document the arm rest can only be folded up and not folded down. The folding down offers the advantage that during the occupation of the driver's seat by the driver the folded-down arm rest has a supporting function for the driver during the occupation. For example, during the occupation of the driver's seat the driver can rest on the folded-down arm rest so that in the frequently confined space in a driver's cab he can stop as close as possible to the seat.

Therefore an object to be achieved is to avoid the above-mentioned problems and at the same time to provide an arm rest arrangement for a seat, in particular for a vehicle seat, which is of particularly simple design and is cost-effective to produce.

This object is achieved according to the invention by the features of claim 1.

In order now to provide an arm rest arrangement which can be folded down, is simple in design as well as cost-effective to produce, the present invention makes use inter alia of the idea of providing a latching and adjusting device for setting an angle of inclination between the arm rest and the arm rest support in a usage position and for folding down the arm rest from a usage position into a non-usage position. In this case the latching and adjusting device for folding down the arm rest within a housing of the arm rest in a rotary element is rotatably mounted and for setting the angle of inclination this device is mounted so as to be rotatable in the housing about its longitudinal axis.

In this case the term "usage position" denotes the position of the arm rest arrangement while the driver has already occupied and is utilising the vehicle seat, that is to say has used the arm rest.

The term "non-usage position" denotes the position of the arm rest, during which the arm rest is folded down. This may be the case in particular when the driver has just occupied the vehicle seat.

Due to the mechanism implemented particularly simply in the present arm rest arrangement by means of the rotary element in which the latching and adjusting device is rotatable, and also due to the characteristic that the latching and adjusting device is rotatable about its longitudinal axis in the housing, a cost-effective and compact mechanism is offered in which both setting of the angle of inclination and also folding down of the arm rest are implemented. Therefore costly mechanical mechanisms for implementation of the setting angle and angle of inclination and/or the folding down of the arm rest is advantageous completely omitted. In this respect the present arm rest arrangement has both a particularly high operational stability and a long service life.

According to at least one embodiment the arm rest arrangement for a seat, in particular for a vehicle seat, comprises an arm rest which is pivotably connected by means of a bearing axis to an arm rest support. Moreover, the arm rest arrangement comprises a latching and adjusting device for setting an angle of inclination between the arm rest and the arm rest support in a usage position and for folding down the arm rest from the usage position into a non-usage position. In this case the latching and adjusting device for folding down the arm rest within a housing of the arm rest in a rotary element is rotatably mounted and for setting the angle of inclination this device is mounted so as to be rotatable in the housing about its longitudinal axis.

According to at least one embodiment the latching and adjusting device is formed with a rotary spindle and also with a spindle grip disposed on a first end of the rotary spindle for hand-operated rotation of the rotary spindle about its longitudinal axis. In this case the rotary spindle with its second end is in mechanical engagement with a supporting cam which is fastened non-rotatably to the arm rest support, wherein for adjustment of the angle of inclination the rotary spindle is movable by means of a rotary movement of the spindle grip towards the supporting cam. In particular by a rotation of the rotary spindle this spindle can for example be rotated out of or along a support for the rotary spindle and moved towards the supporting cam. The supporting cam is preferably disposed on the bearing axis for the arm rest. Moreover, the spindle grip can be at least partially viewed and/or inspected optically from the outside and can be manually rotated about the longitudinal axis of the rotary spindle. Through the movement of the rotary spindle towards the supporting cam, the arm rest which is pivotably disposed in the bearing axis is supported against the arm rest support. Thus the angle of inclination the arm rest can be changed above by means of rotation of the rotary spindle. In this respect a particularly simple mechanism is presented, by means of which by a simple rotation of the rotary spindle towards the supporting cam an angle of inclination can be set between the arm rest and the arm rest support.

According to at least one embodiment, for adjustment of the angle of inclination the second end of the rotary spindle is guided in a thread within the housing, wherein the spindle grip is mounted on or in the housing so as to be immovable in the longitudinal direction. The thread is preferably milled in for example into the rotary spindle itself in the region of the second end of the rotary spindle. Thus by means of rotation of the rotary spindle by rotation of the spindle grip it is possible, by guiding the rotary spindle along in its thread, to set the rotary spindle itself in a particularly stable manner with fine adjustment.

According to at least one embodiment, the second end of the rotary spindle is guided via the thread in a guide nut for guiding the rotary spindle in the longitudinal direction, wherein the guide nut is fastened on the arm rest or the arm rest support so as to be rotatable about the bearing axis. In particular the guide nut serves for locking of the second end as precisely as possible on a contact region between the second end and the supporting cam. In this respect a juddering of the second end on or in the region of the supporting cam is avoided by the guide nut and the second end is therefore fixed predeterminably on the supporting cam. If the arm rest is folded down, the guide nut is designed and disposed within the arm rest in such a way that the second end of the rotary spindle is guided about the supporting cam and is released therefrom. In this respect one such release mechanism from the supporting cam and guide mechanism during the folding down by the guide nut and a mounting of the guide nut on the bearing axis is of particularly simple construction and is stable in operation. In particular the supporting cam can form a stop for the folded-down arm rest.

According to at least one embodiment the rotary element is formed by a rotational opening in a guide element, wherein the rotary spindle is guided through the rotational opening as far as a stop of the spindle grip on the guide element and a rim of the rotational opening forms a centre of rotation for the rotary element. The guide element is for example a metal plate into which a hole is introduced as the rotational opening. The rim of the hole then forms the centre of rotation, wherein the spindle grip is disposed on one side of the centre of rotation, that is to say for example in the form of a first lever end, and the rotary spindle or the remaining extent of the rotary spindle comprising the second end is disposed on the other side of the centre of rotation, for example in the form of a second lever end. Such a rotational opening can be introduced into and/or formed out of such a metal plate in a particularly simple and cost-effective manner. Thus a costly rotary bearing is advantageously avoided.

According to at least one embodiment, for folding down the arm rest from the usage position into the non-usage position, a lever extension of the latching and adjusting device disposed on a side of the spindle grip opposite the rotary spindle is rotatable about the centre of rotation by means of an operating element which is connected to the housing so as to be immovable in the longitudinal direction and/or mounted in the housing. In other words, in such a configuration the spindle grip is disposed between the rotary spindle and the lever extension. The operating element may for example be a push button and/or some other pushing element which is in engagement with a free end of the lever extension of the latching and adjusting device and is for example fastened thereto. As a result of the fact that the operating element is connected to the housing so as to be immovable in the longitudinal direction and/or is guided in the housing, irrespective of the tilted position of the arm rest the operating element for a user of the arm rest arrangement is always disposed at the same point on or within the housing and thus irrespective of the position of the arm rest with respect to the arm rest support is disposed at the same point at least in this longitudinal direction. In particular the operating element may not be mechanically connected firmly to the lever extension. The lever extension is for example set into a socket on the operating element in the longitudinal direction and is disposed in this socket so as to be for example slidable and/or movable in the longitudinal direction. In this case the socket can merely fix the free end of the lever extension in a direction extending vertically with respect to the longitudinal direction. In this respect may the end of the lever extension can be raised particularly simply in this vertically extending direction by means of the operating element.

According to at least one embodiment the lever extension and/or the operating element is mechanically firmly connected to one end of a compression spring disposed inside the housing and can be pushed together with the compression spring in the direction of a spring contact point on the housing, wherein the rotary spindle is releasable by the actuation of the operating element by a mechanical contact with the supporting cam, and wherein by the action of gravity and/or an additional external force the arm rest can be folded down into the non-usage position. If the operating element is not actuated, the latching and adjusting device is in a latching state or a latching position. In such a state the second end of the rotary spindle presses against the supporting cam, so that the entire arm rest is supported, that is to say locked, against the supporting cam. If the operating element is actuated, for example by means of pressing the operating element in the vertical direction, a second end of the compression spring is pressed against the spring contact point on the housing, that is to say against the housing itself, so that the compression spring is compressed and pushed together. Because the entire latching and adjusting device is rotatably mounted in the rotary element, due to such lifting of the lever extension on the other side, i.e. the opposite side, of the rotary element the second end of the rotary spindle is released from the contact region on the supporting cam, so that after the actuation of the operating element the second end of the rotary spindle and the supporting cam are no longer in direct contact with one another. The arm rest is then unlocked and can be folded down particularly simply after the unlocking Due to such a lever-like configuration of the latching and adjusting device, by means of one single actuation, that is to say movement of the operating element in the direction of the spring contact point, the arm rest can for example be gradually folded down.

According to at least one embodiment, the lever extension is guided in a guide opening in the guide element. In such a configuration the guide opening and the rotational opening of the guide element preferably lie opposite one another in the longitudinal direction, wherein the spindle grip is disposed between the two in the longitudinal direction. In this case the guide element can to some extent run around and enclose the spindle grip. In particular the guide opening may be an opening in the form of a longitudinal hole, so that in a particularly simple and cost-effective manner an effective guiding of the lever extension is provided in particular in the vertical direction by a configuration of the guide opening in the form of a longitudinal hole.

According to at least one embodiment, for actuation of the operating element and movement thereof in a direction extending vertically with respect to the longitudinal direction, as well as during the folding down for movement of the lever extension and of the spindle grip in each case this latter is provided within the housing or spaces formed by the housing. In particular the operating element for actuation of the lever extension can be disposed in such a free space within one end of the arm rest. Therefore such free spaces on the one hand avoid a mechanical collision between the spindle grip and the operating element and between the spindle grip and the remaining fitting regions of the arm rest and on the other hand enable a construction which is as compact and space-saving as possible due to an integration of the operating element and of the spindle grip for example inside the housing of the arm rest, wherein in spite of such integration of the operating element and of the spindle grip in the housing these can always be reached and operated manually from the outside.

Furthermore a vehicle seat is provided. The vehicle seat comprises at least one arm rest arrangement, such as is described in connection with one or more of the above-mentioned embodiments. In other words, the features listed for the arm rest arrangement described here are also disclosed for the vehicle seat described here, and vice versa.

In particular the vehicle seat described here has the advantages and effects described in conjunction with the arm rest arrangement.

The arm rest arrangement described here as well as the vehicle seat described here are explained in greater detail below with reference to embodiments and the associated drawings.

Figure 1A:
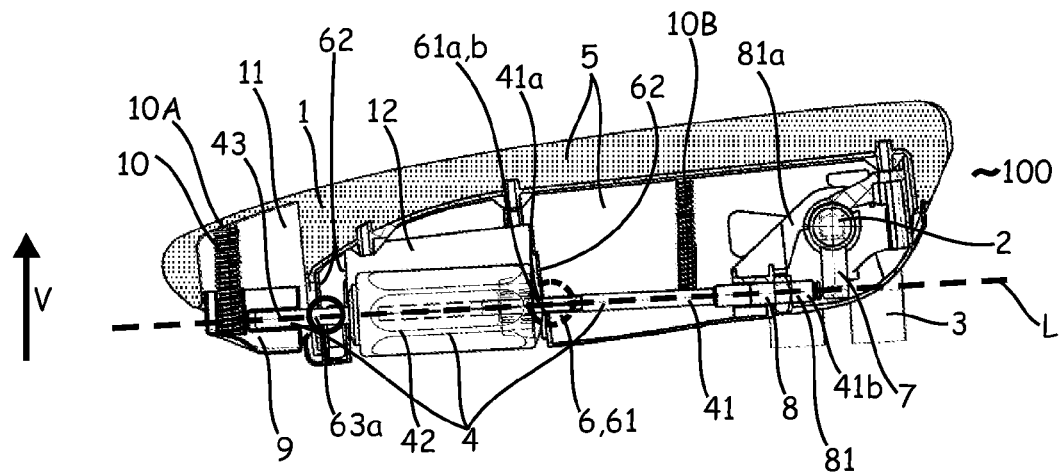
FIGS. 1A to 1D show, in s sectional view, an embodiment of an arm rest arrangement described here in various positions of the arm rest arrangement described here.

In the embodiments and in the drawings the same or equivalent components are in each case provided with the same reference signs. The illustrated elements should not be regarded as drawn to scale; on the contrary, individual elements may be shown as excessively large to aid understanding.

FIG. 1A shows with the aid of a schematic representation an arm rest arrangement 100 for a seat, in particular for a vehicle seat, with an arm rest 1 which is pivotably connected by means of a bearing axis 2 to an arm rest support 3. The arm rest arrangement 100 comprises a latching and adjusting device 4 for setting an angle of inclination between the arm rest 1 and the arm rest support 3 in a usage position and for folding down the arm rest 1 from the usage position into a non-usage position, wherein the latching and adjusting device 4 is mounted so as to be rotatable in a rotary element 6 within a housing 5 of the armrest 1. In order to set the angle of inclination the latching and adjusting device 4 is mounted so as to be rotatable in the housing 5 about its longitudinal axis L.

In this case the latching and adjusting device 4 comprises a rotary spindle 41 as well as a spindle grip 42 disposed on a first end 41a of the rotary spindle 41 for manual rotation of the rotary spindle 41 about its longitudinal axis L. The rotary spindle 41 with its second end 41b is in mechanical engagement with a supporting cam 7 which is fastened non-rotatably to the arm rest support 3, wherein for adjustment of the angle of inclination the rotary spindle 41 is movable by means of a rotary movement of the spindle grip 42 towards the supporting cam 7. In this case the second end 41b of the rotary spindle 41 is supported on the supporting cam 7, so that in FIG. 1A the arm rest arrangement 100, i.e. the arm rest 1 itself, is located in a latching position, that is to say in the usage position.

For setting of the angle of inclination the second end 41b of the rotary spindle 41 is guided inside the housing 5 in a thread 8, wherein the spindle grip 42 is mounted and guided immovably in the longitudinal direction L in a free space 12 within the housing 5.

Furthermore it can be clearly seen in FIG. 1A that the rotary spindle 41, in particular the second end 41b of the rotary spindle 41 and the thread 8 which is introduced into the rotary spindle 41 in the second end 41b, is guided in a guide nut 81 in the longitudinal direction L, wherein the guide nut 81 is mounted so as to be rotatable on the arm rest support 3 about the bearing axis 2. For this purpose the guide nut 81 is mounted on the bearing axis 2 by means of a holding element 81a within the housing 5. Moreover in the present embodiment the rotary element 6 is formed by a rotational opening 61 in a guide element 62, wherein the rotary spindle 41 is guided through the rotational opening 61 as far as a stop of the spindle grip 42 on the guide element 62 and a rim 61b of the rotational opening 61 forms a centre of rotation 61a for the rotary element 6.

Moreover the arm rest arrangement 100 has a lever extension 43 of the latching and adjusting device 4 disposed on a side of the spindle grip 42 opposite the rotary spindle 41 for folding down the arm rest 1 from the usage position into the non-usage position by means of an operating element 9 which is mounted in the housing 5 so as to be immovable in the longitudinal direction L. In this case the entire arrangement consisting of the rotary spindle 41, the spindle grip 42 as well as the lever extension 43 is rotatable about the centre of rotation 61a. In this case the lever extension 43 and the spindle grip 42 together form a first lever element and the rotary spindle 41 and a second lever element forms the latching and adjusting device 4.

Furthermore the lever extension 43 and the operating element 9 are firmly connected mechanically to one end of a compression spring 10 and can be pressed together with the compression spring 10 in the direction of a spring contact point 10A of the housing 5. After the compression, a second end of the compression spring 10 and the spring contact point 10A are pressed onto one another, so that the compression spring 10 is compressed. In this case the rotary spindle 41 can be released by actuation of the operating element 9 from a mechanical contact with the supporting cam 7, wherein by the effect of gravity the arm rest 1 can be folded down into the non-usage position (see also FIG. 1D). For guiding the lever extension 43 the guide element 62 has a guide opening 63a. This opening is a longitudinal hole with a main extension direction in a vertical direction V. If the operating element 9 is then pressed in the direction of the spring contact point 10A, one end of the lever extension 43 is likewise moved in this direction. For this purpose the free end of the lever extension 43 is introduced into a frame on the operating element 9, wherein the lever extension 43 is for example slidable in the longitudinal direction L inside the frame on the operating element 9. Alternatively the lever extension 43 is firmly introduced (for example adhered) mechanically and statically into the frame on the operating element 9. In any case it is possible that in the event of a movement of the operating element 9 in the vertical direction V the operating element 9 can move unhindered in the vertical direction in the free space 11 inside the housing 5 and the operating element 9 remains positioned immovably in the longitudinal direction during such a movement. Therefore for the driver such an operating element 9 is always reachable at the same point within the arm rest arrangement.

As an alternative or in addition to the compression spring 10 described here, in the longitudinal direction L between the guide nut 8 and the rotational opening 61 (see FIG. 1A) at least one further spring 10B can be firmly connected, for example engaged, with its first end to the rotary spindle 41 and with its second end inside the housing 5 to an inner surface of the housing 5. In this case the further spring 10B is constantly under tensile stress.

Figure 1B:
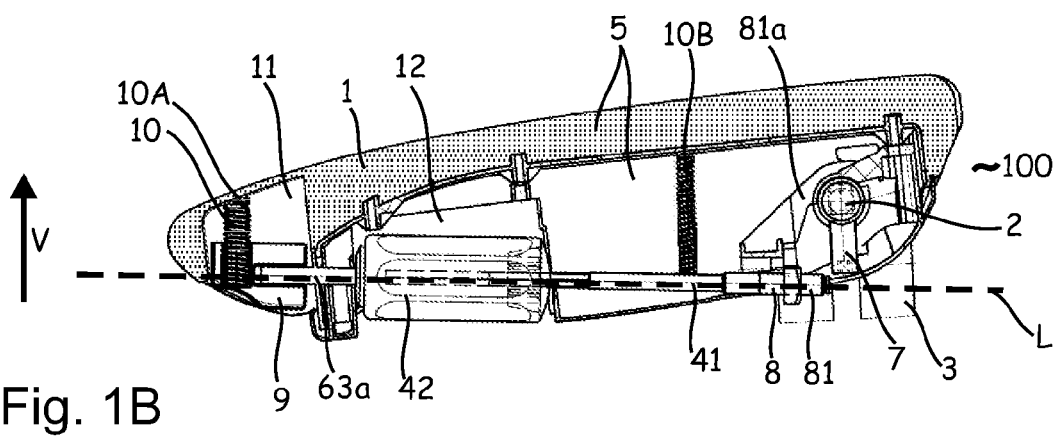

In FIG. 1B it is shown how the operating element 9 described above is pressed and thus the compression spring 10 is compressed. Since the entire latching and adjusting device 4 is rotatably mounted in the rotational opening 61, by such movement of the lever extension 43 the second end 41b of the rotary spindle 41 is moved away from the supporting cam 7, that is to say moved downwards and therefore released therefrom.

Figure 1C:
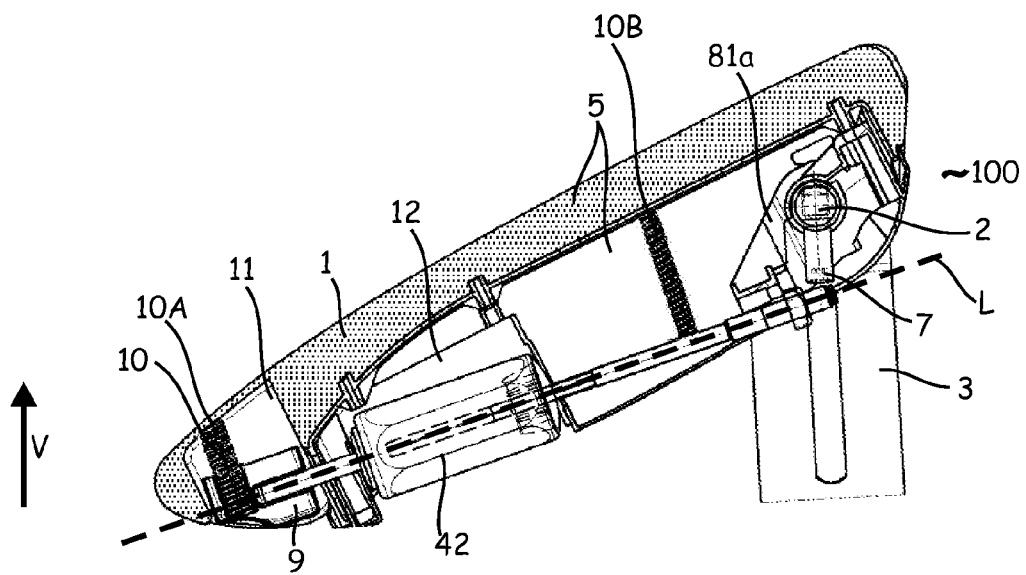
Figure 1D:
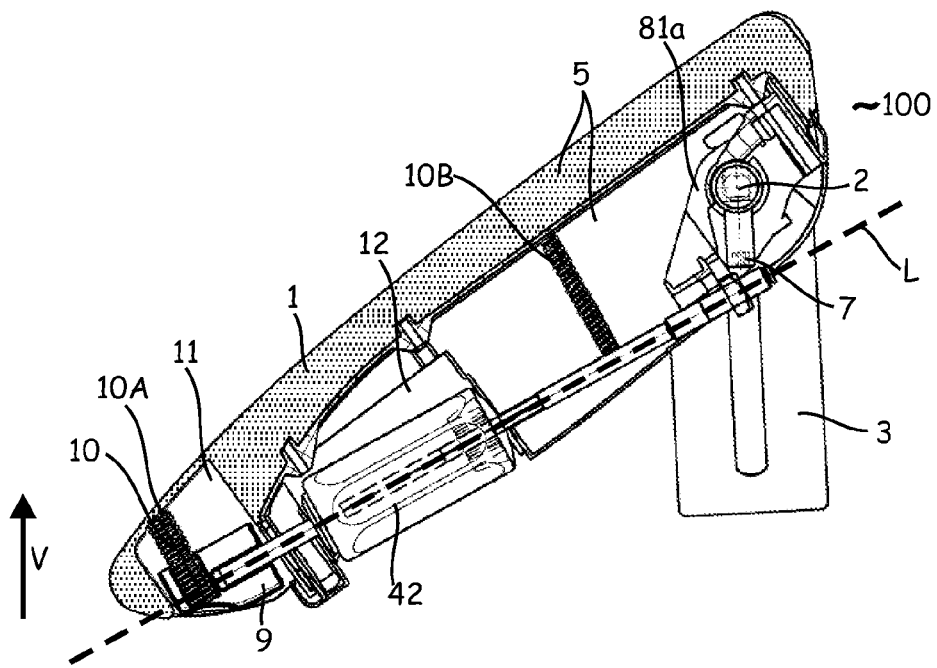
Figure 2A:
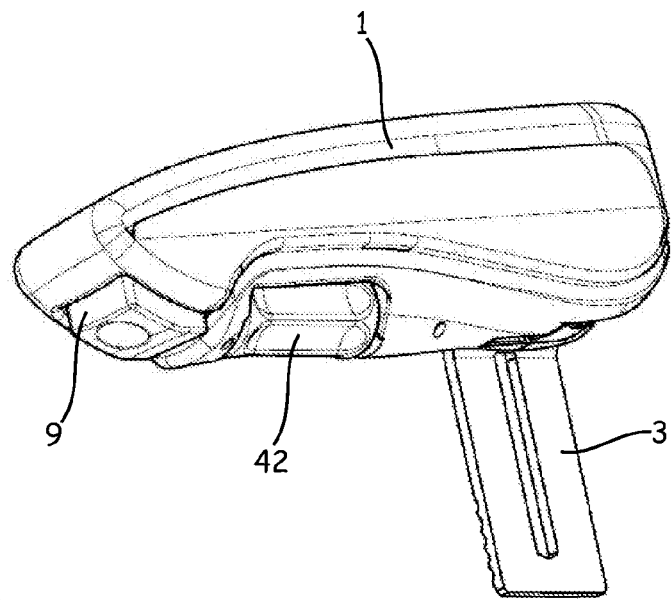
FIGS. 2A to 2D show in schematic perspective views from below the arm rest arrangement shown respectively in FIGS. 1A to 1D in positions corresponding to FIGS. 1A until 1D.
Figure 2B:
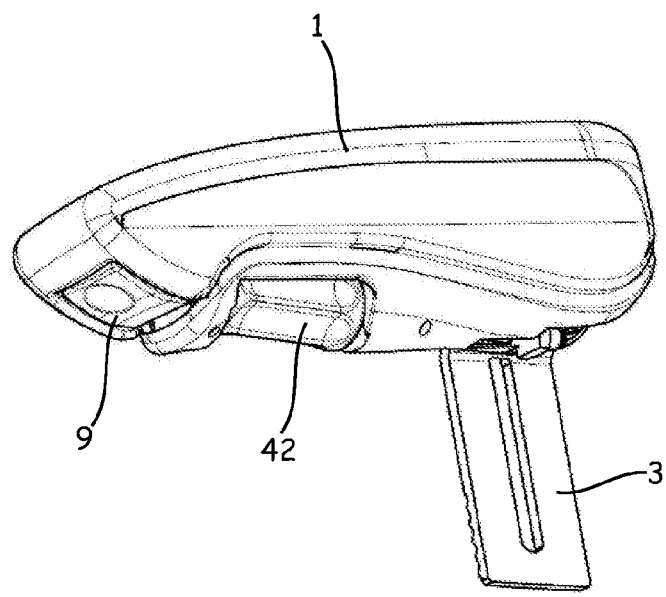
Figure 2C:
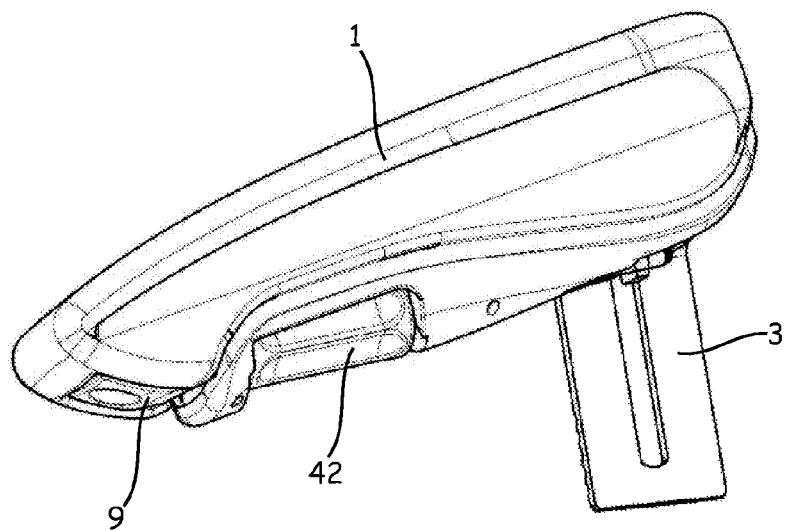
Figure 2D:
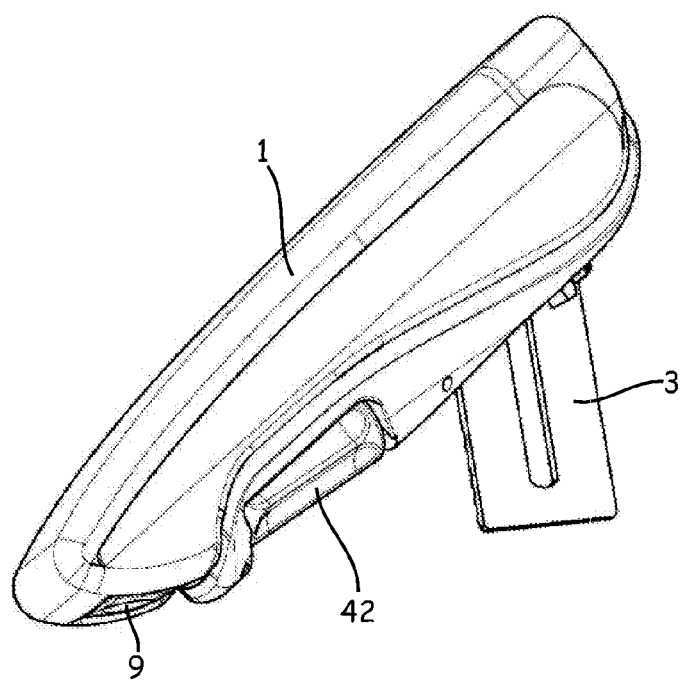

FIGS. 1C and 1D also show how for example under the effect of gravity the arm rest 1 is gradually inclined downwards and folded down.

FIGS. 2A to 2D show the arm rest arrangement shown respectively in FIGS. 1A to 1D in schematic perspective views from below corresponding to FIGS. 1A until 1D.

Figure 3A:
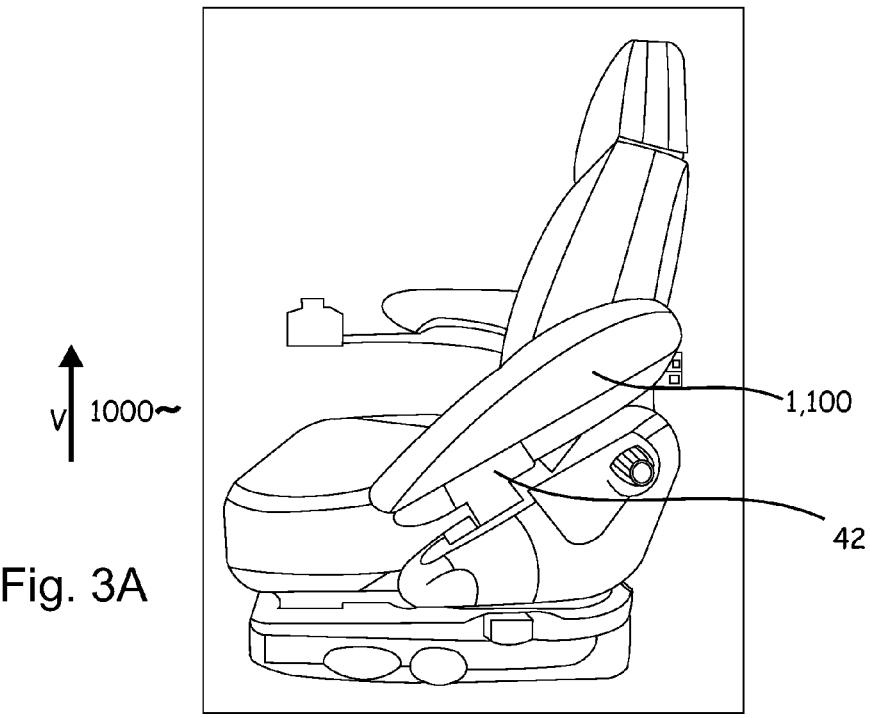
FIGS. 3A to 3G show photographs of an embodiment of a vehicle seat described here comprising two of the arm rest arrangements described here.
Figure 3B:
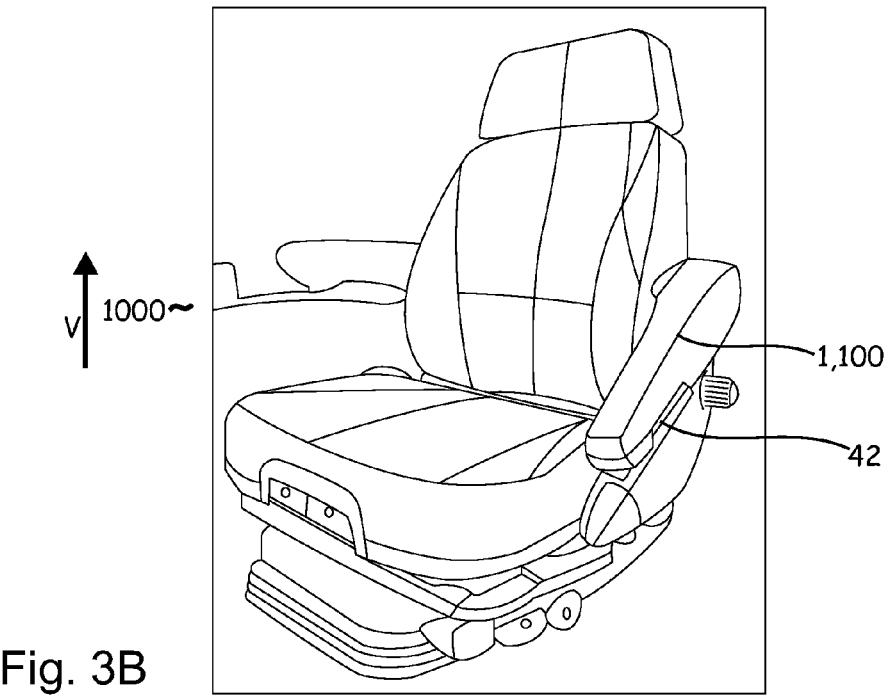
Figure 3C:
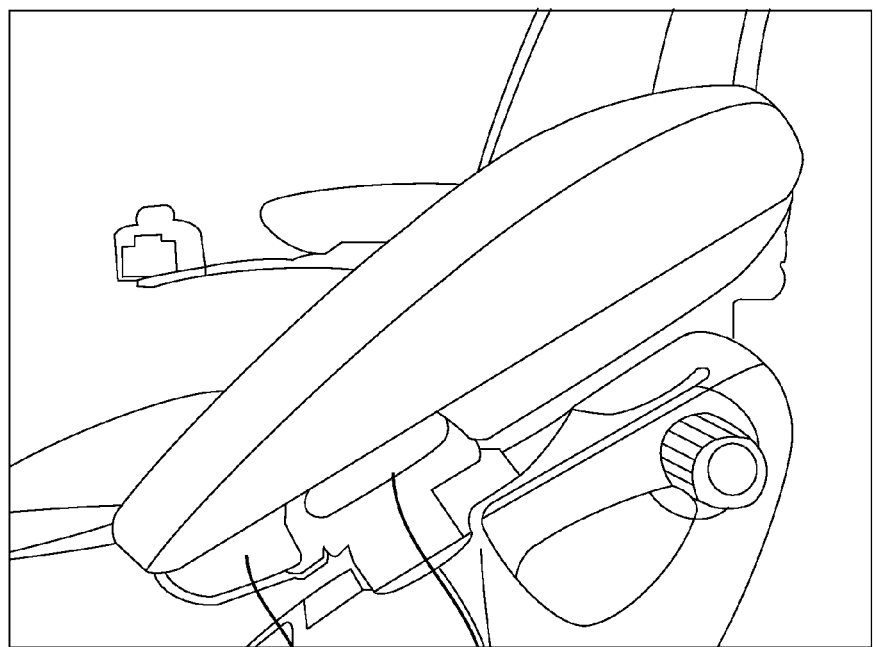
Figure 3D:
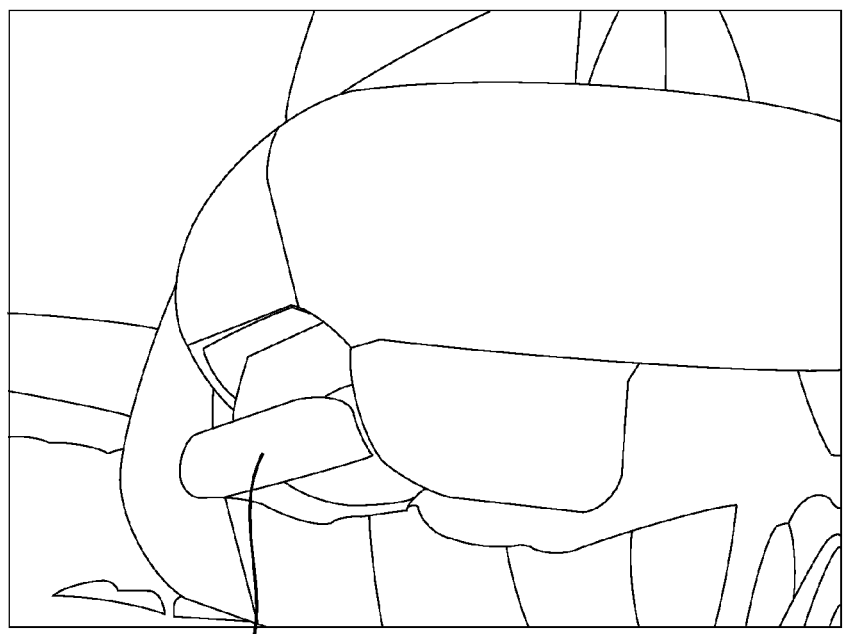
Figure 3E:
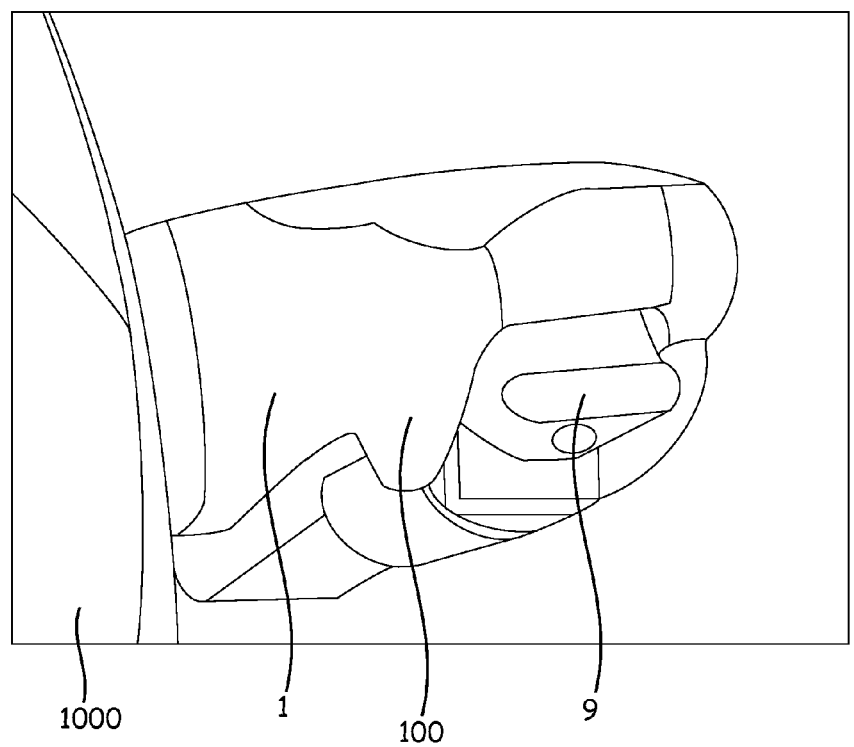
Figure 3F:
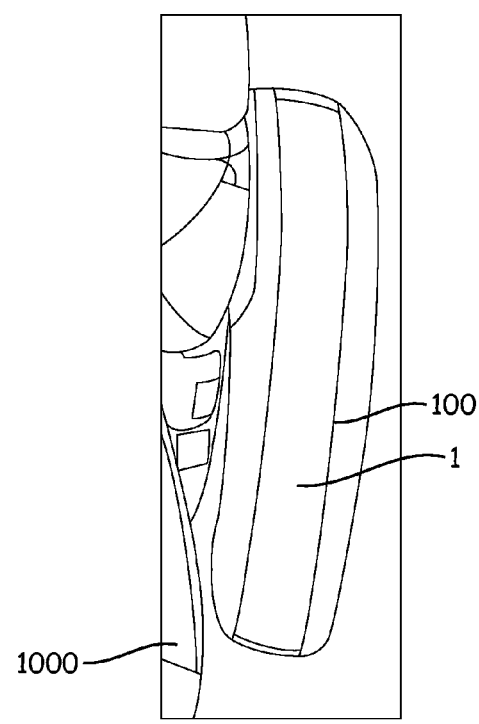
Figure 3G:
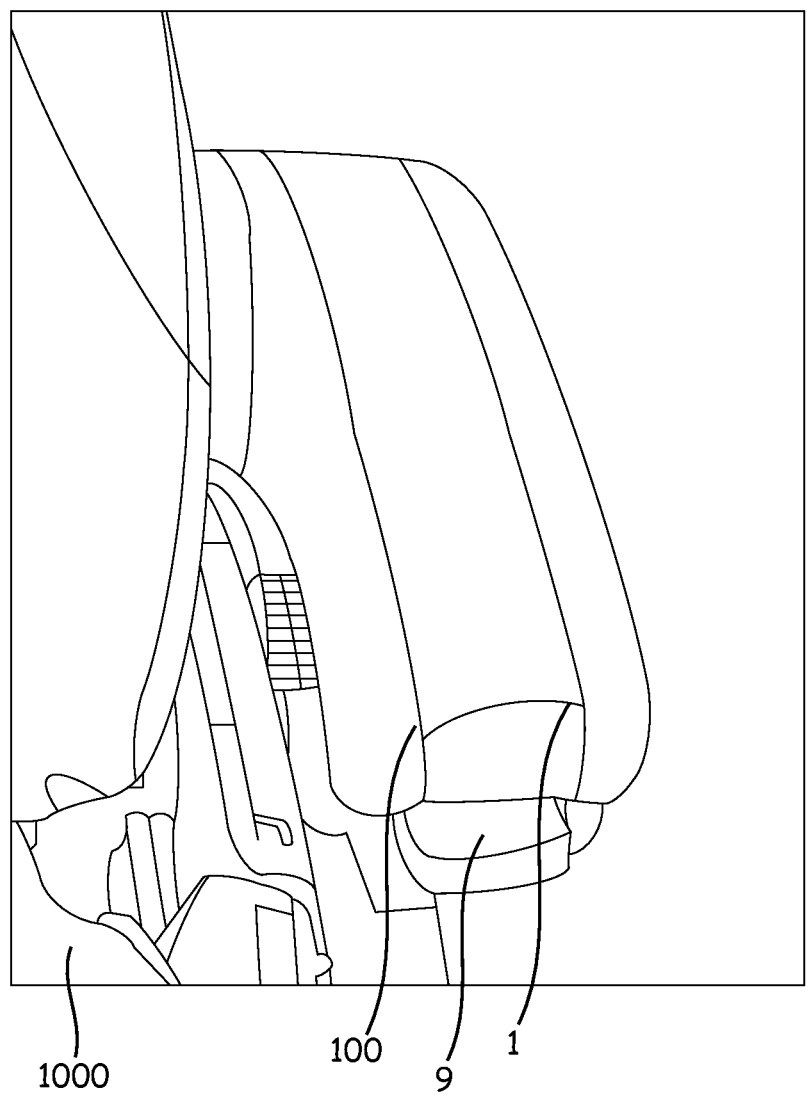

FIGS. 3A to 3G each describe different perspective photographs of an embodiment of a vehicle seat 1000 described here. The arm rest arrangement 100 which is already folded down can be seen, and in the present embodiment is vertically adjustable for example in the vertical direction V. In particular FIG. 3D shows an illustration of the operating element 9 described here, which can be operated particularly simply by the driver lifting it up manually.

Figure 4A:
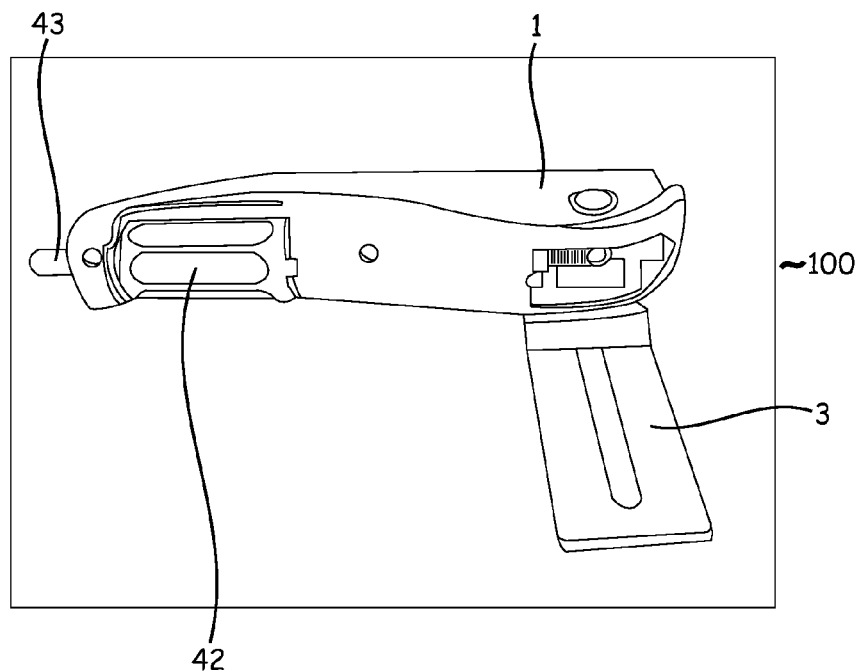
FIGS. 4A to 4D show various detailed photographs in different perspective views of the arm rest arrangement described here.
Figure 4B:
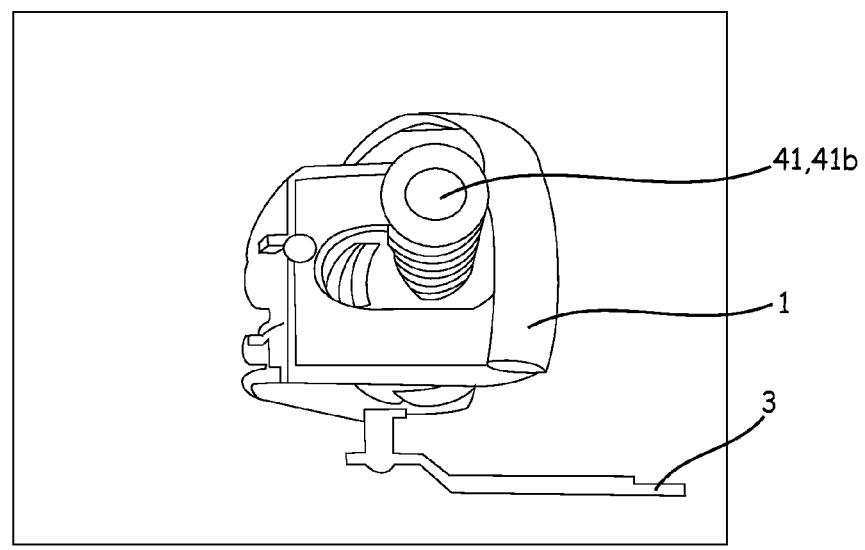
Figure 4C:
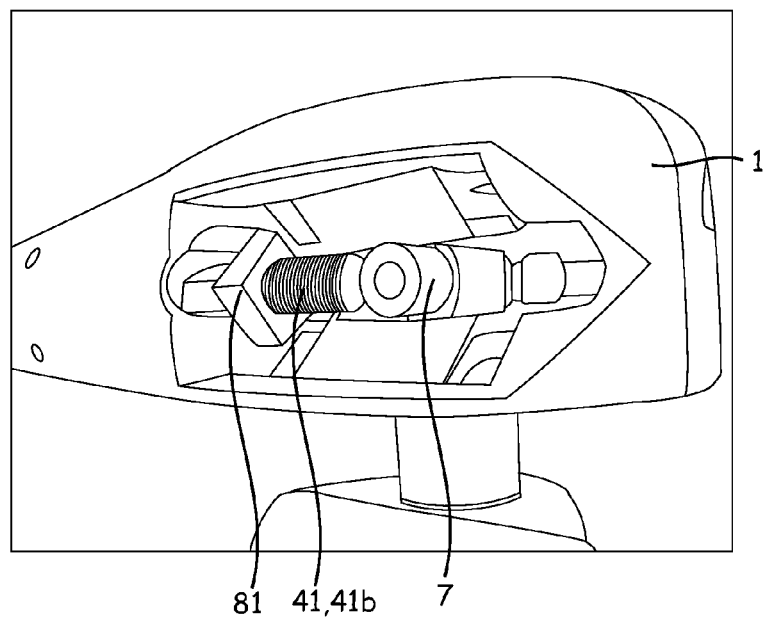
Figure 4D:
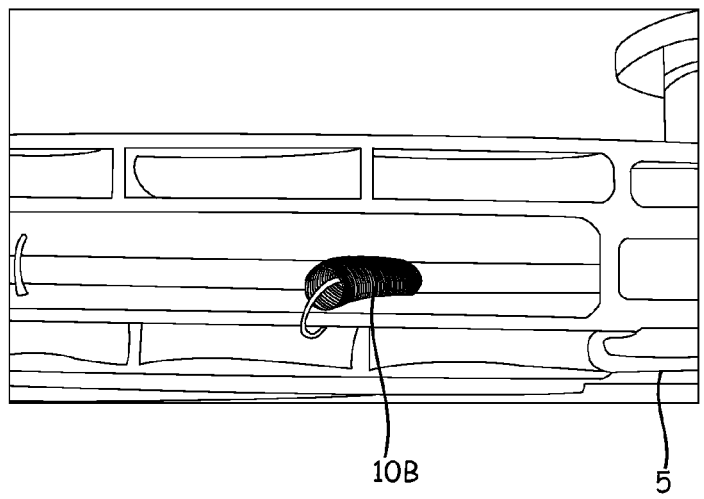
Figure 5A:
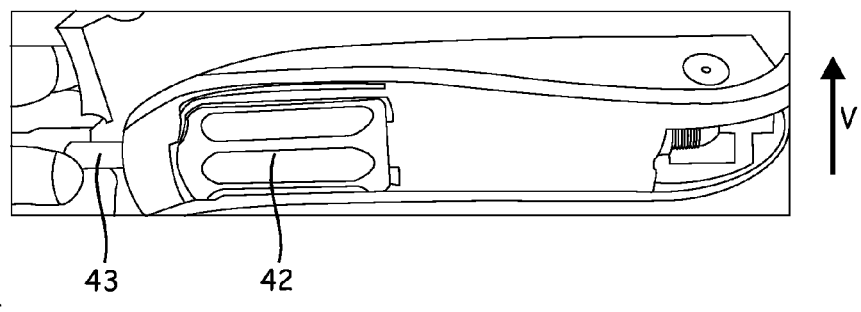
FIGS. 5A to 5E show, in various detailed perspective photographs, various positions of the arm rest arrangement described here.
Figure 5B:
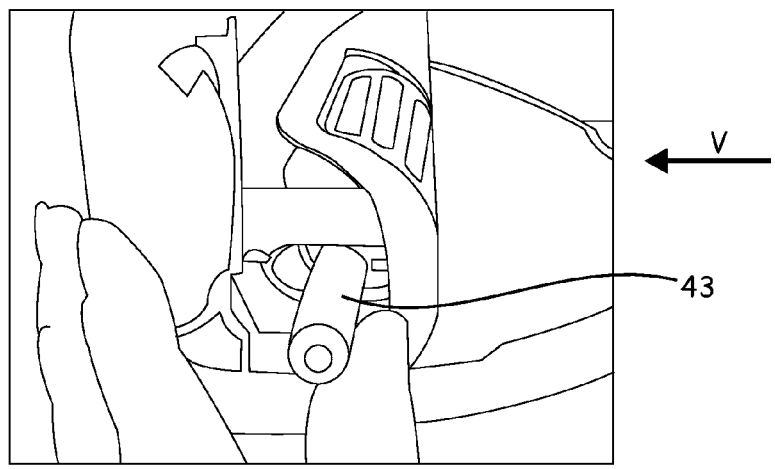
Figure 5C:
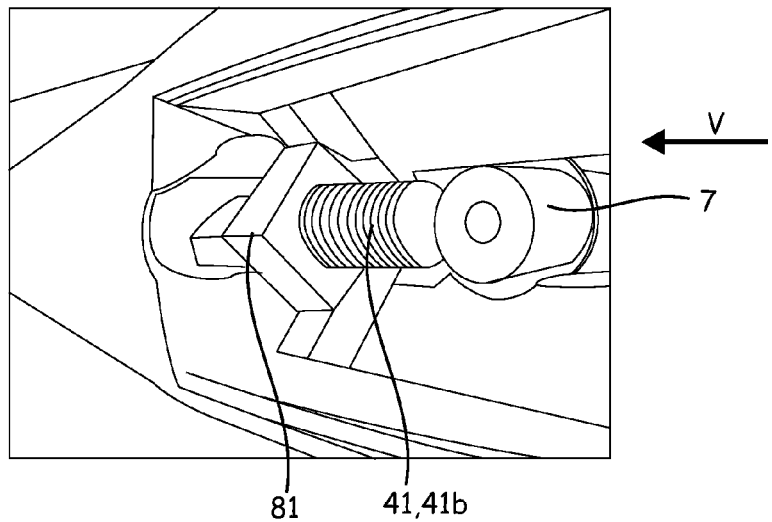
Figure 5D:
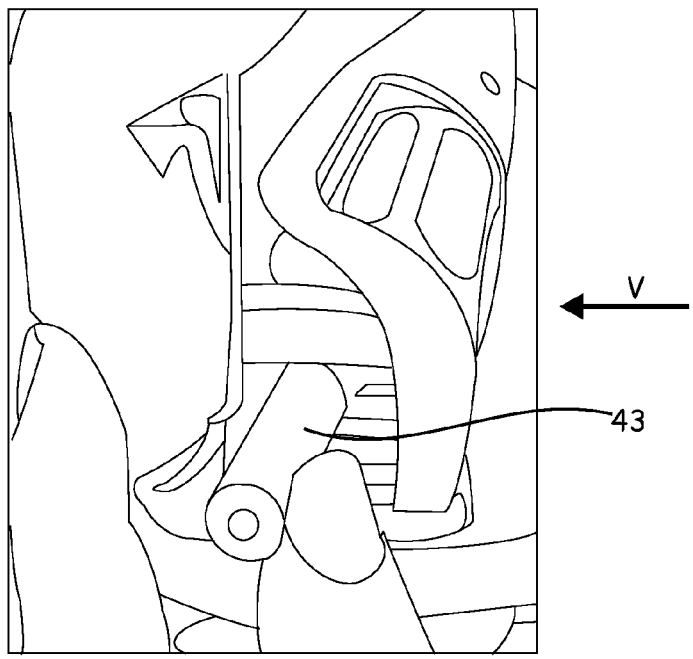
Figure 5E:
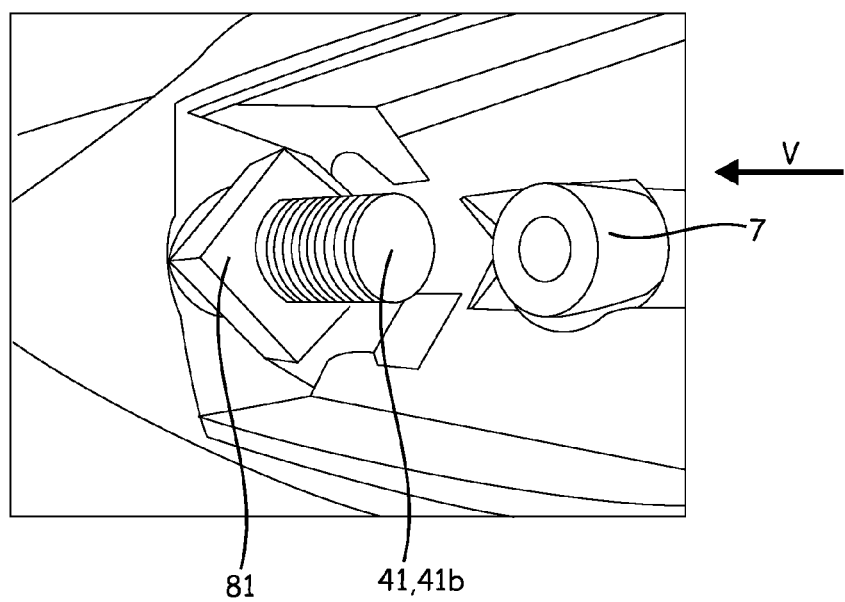

FIGS. 4A to 4D show various perspective photographs of the arm rest arrangement 100 described here, wherein the guide nut 81, the second end 41b of the rotary spindle 41 and the supporting cam 7 are shown particularly simply in particular by FIGS. 4B and 4C. For this purpose the arm rest arrangement 100 according to FIGS. 4A to 4D is operated in the respective latching position, so that, as can be easily seen in FIG. 4C, the second end 41b of the rotary spindle 41 is supported on the supporting cam. Furthermore FIG. 4D shows a detailed representation of the positioning of the further spring 10B and the engagement in or on an inner wall of the housing 5.

In FIGS. 5A to 5E the arm rest arrangement 100 described here is shown respectively in a usage position (i.e. latching position) and in a non-usage position (i.e. folded-down position). The usage position corresponds to the representation according to FIGS. 5B and 5C, wherein the non-usage position can be seen particularly clearly from FIGS. 5D and 5E. For this purpose the second lever end 43 (the operating element 9 is not shown here) is raised manually, so that the second end 41b of the rotary spindle 41 is moved away from the supporting cam 7 (see FIG. 5E). In this respect the arm rest 1 can be folded down by means of the effect of gravity and/or the effect of an additional external force.

The invention is not limited by the description with reference to the embodiments. On the contrary, the invention encompasses each new feature as well as any combination of features, in particular including any combination of features in the claims, even if this feature or this combination itself is not explicitly given in the claims or in the embodiments.

LIST OF REFERENCE SIGNS

L longitudinal axis L
V vertical direction V
1 arm rest
2 bearing axis
3 arm rest support
4 latching and adjusting device
5 housing
6 rotary element
7 supporting cam
8 thread
9 operating element
10 compression spring
10A spring contact point
10B further spring
11 free space
12 free space
41 rotary spindle
41a first end
41b second end
42 spindle grip
43 lever extension
61 rotational opening
61a centre of rotation
61b rim
62 guide element
63a guide opening
81 guide nut
81a holding element
100 arm rest arrangement
1000 vehicle seat

What is claimed is:

1. An arm rest arrangement for a seat, in particular for a vehicle seat, comprising:
    an arm rest which is pivotably connected by means of a bearing axis to an arm rest support; and
    a latching and adjusting device for setting an angle of inclination between the arm rest and the arm rest support in a usage position and for folding down the arm rest from the usage position into a non-usage position, wherein the latching and adjusting device is mounted so as to be rotatable in a rotary element within a housing of the armrest, wherein the latching and adjusting device is mounted so as to be rotatable about its longitudinal axis (L) in the housing for setting of the angle of inclination, wherein the latching and adjusting device is formed with a rotary spindle as well as a spindle grip disposed on a first end of the rotary spindle for manual rotation of the rotary spindle about its longitudinal axis (L), wherein the rotary spindle with its second end is in mechanical engagement with a supporting cam which is fastened non-rotatably to the arm rest support, and wherein for adjustment of the angle of inclination the rotary spindle is movable by means of a rotary movement of the spindle grip towards the supporting cam.

2. The arm rest arrangement as claimed in claim 1, wherein the lever extension is guided in a guide opening in the guide element.

3. The arm rest arrangement as claimed in claim 1, wherein for actuation of the operating element and movement thereof in a direction extending vertically with respect to the longitudinal direction (L), as well as during the folding down for movement of the lever extension and of the spindle grip in each case this latter is provided within the housing or spaces formed by the housing.

4. The arm rest arrangement as claimed in claim 1, wherein a lever extension of the latching and adjusting device disposed on a side of the spindle grip opposite the rotary spindle for folding down the arm rest from the usage position into the non-usage position is rotatable about the centre of rotation by means of an operating element which is mounted in the housing so as to be immovable in the longitudinal direction (L).

5. The arm rest arm rest arrangement as claimed in claim 4, wherein the lever extension and/or the operating element is mechanically firmly connected to one end of a compression spring disposed inside the housing and can be pushed together with the compression spring in the direction of a spring contact point on the housing, and the rotary spindle is releasable by the actuation of the operating element by a mechanical contact with the supporting cam, wherein by the action of gravity and/or an additional external force the arm rest can be folded down into the non-usage position.

6. The arm rest arrangement as claimed in claim 1, wherein the rotary element is formed by a rotational opening in a guide element, wherein the rotary spindle is guided through the rotational opening as far as a stop of the spindle grip on the guide element and a rim of the rotational opening forms a centre of rotation for the rotary element.

7. The arm rest arrangement of claim 6, wherein a lever extension of the latching and adjusting device disposed on a side of the spindle grip opposite the rotary spindle for folding down the arm rest from the usage position into the non-usage position is rotatable about the centre of rotation by means of an operating element which is mounted in the housing so as to be immovable in the longitudinal direction (L).

8. The arm rest arrangement of claim 7, wherein the lever extension and/or the operating element is mechanically firmly connected to one end of a compression spring disposed inside the housing and can be pushed together with the compression spring in the direction of a spring contact point on the housing, and the rotary spindle is releasable by the actuation of the operating element by a mechanical contact with the supporting cam, wherein by the action of gravity and/or an additional external force the arm rest can be folded down into the non-usage position.

9. The arm rest arrangement as claimed in claim 1, wherein for setting of the angle of inclination the second end of the rotary spindle is guided inside the housing in a thread, wherein the spindle grip is mounted immovably in the longitudinal direction (L).

10. The arm rest arrangement of claim 9, wherein the rotary element is formed by a rotational opening in a guide element, wherein the rotary spindle is guided through the rotational opening as far as a stop of the spindle grip on the guide element and a rim of the rotational opening forms a centre of rotation for the rotary element.

11. The arm rest arrangement of claim 9, wherein the lever extension is guided in a guide opening in the guide element.

12. The arm rest arrangement of claim 9, wherein a lever extension of the latching and adjusting device disposed on a side of the spindle grip opposite the rotary spindle for folding down the arm rest from the usage position into the non-usage position is rotatable about the centre of rotation by means of an operating element which is mounted in the housing so as to be immovable in the longitudinal direction (L).

13. The arm rest arrangement of claim 12, wherein the lever extension and/or the operating element is mechanically firmly connected to one end of a compression spring disposed inside the housing and can be pushed together with the compression spring in the direction of a spring contact point on the housing, and the rotary spindle is releasable by the actuation of the operating element by a mechanical contact with the supporting cam, wherein by the action of gravity and/or an additional external force the arm rest can be folded down into the non-usage position.

14. The arm rest arrangement as claimed in claim 9, wherein the second end of the rotary spindle is guided by means of the thread in a guide nut for guiding the threaded spindle in the longitudinal direction (L), wherein the guide nut is mounted so as to be rotatable on the arm rest or the arm rest support about the bearing axis.

15. The arm rest arrangement of claim 14, wherein the rotary element is formed by a rotational opening in a guide element, wherein the rotary spindle is guided through the rotational opening as far as a stop of the spindle grip on the guide element and a rim of the rotational opening forms a centre of rotation for the rotary element.

16. The arm rest arrangement of claim 14, wherein the lever extension is guided in a guide opening in the guide element.

17. The arm rest arrangement of claim 14, wherein a lever extension of the latching and adjusting device disposed on a side of the spindle grip opposite the rotary spindle for folding down the arm rest from the usage position into the non-usage position is rotatable about the centre of rotation by means of an operating element which is mounted in the housing so as to be immovable in the longitudinal direction (L).

18. The arm rest arrangement of claim 17, wherein the lever extension and/or the operating element is mechanically firmly connected to one end of a compression spring disposed inside the housing and can be pushed together with the compression spring in the direction of a spring contact point on the housing, and the rotary spindle is releasable by the actuation of the operating element by a mechanical contact with the supporting cam, wherein by the action of gravity and/or an additional external force the arm rest can be folded down into the non-usage position.

19. A vehicle seat, comprising:
an arm rest which is pivotable connected by means of a bearing axis to an arm rest support; and
a latching and adjusting device for setting an angle of inclination between the arm rest and the arm rest support in a usage position and for folding down the arm rest from the usage position into a non-usage position, wherein the latching and adjusting device is mounted so as to be rotatable in a rotary element within a housing of the armrest, wherein the latching and adjusting device is mounted so as to be rotatable about its longitudinal axis (L) in the housing for setting of the angle of inclination, wherein the latching and adjusting device is formed with a rotary spindle as well as a spindle grip disposed on a first end of the rotary spindle for manual rotation of the rotary spindle about its longitudinal axis (L), wherein a second end of the rotary spindle is in mechanical engagement with a supporting cam which is fastened non-rotatably to the arm rest support, and wherein for adjustment of the angle of inclination the rotary spindle is movably by means of a rotary movement of the spindle grip towards the supporting cam.

* * * * *